United States Patent [19]

Katz

[11] 3,944,677

[45] Mar. 16, 1976

[54] PERCOLATION PROCESS

[75] Inventor: Saul N. Katz, Monsey, N.Y.

[73] Assignee: General Foods Corporation, White Plains, N.Y.

[22] Filed: June 3, 1975

[21] Appl. No.: 583,348

Related U.S. Application Data

[63] Continuation of Ser. No. 442,720, Feb. 14, 1974, abandoned.

[52] U.S. Cl. ............... 426/432; 23/270 R; 23/272.5
[51] Int. Cl.² ...................... A23F 1/08; B01D 11/02
[58] Field of Search ........................... 426/425–434, 426/594, 595; 23/272 R, 272.5, 269, 270 R; 261/94

[56] References Cited
UNITED STATES PATENTS

| | | |
|---|---|---|
| 2,088,497 | 7/1937 | Tijmastra .......................... 261/94 X |
| 2,271,671 | 2/1942 | Wible .............................. 261/94 X |
| 2,931,727 | 4/1960 | Kraut ................................. 426/432 |
| 3,796,805 | 3/1974 | Lemonnier ..................... 426/432 X |

*Primary Examiner*—Frank W. Lutter
*Assistant Examiner*—N. Greenblum
*Attorney, Agent, or Firm*—Bruno P. Struzzi; Richard Kornutik

[57] ABSTRACT

An improved coffee percolation process is disclosed whereby improved yields of soluble coffee solids are obtained from roasted and ground coffee. The extraction columns of the percolator set are loaded with roasted and ground coffee such that there is a continually decreasing average particle size in the direction of flow of the extraction liquid.

1 Claim, No Drawings

PERCOLATION PROCESS

This is a continuation, of application Ser. No. 442,720, filed Feb. 14, 1974 now abandoned.

BACKGROUND OF THE INVENTION

This invention relates to coffee and more particularly to a coffee percolation process wherein soluble coffee solids are extracted from roasted and ground to produce a coffee extract which is further processed into a dry, reconstitutable soluble coffee powder.

Percolation is the semi-continuous countercurrent extraction of soluble coffee solids from roasted and ground coffee. The extraction process is performed in a percolator set which is a series of extraction columns, generally 4 to 6. At steady-state operation, the extraction columns contain roasted and ground coffee of varying degrees of extraction. An aqueous extraction liquid, generally water, is fed at elevated temperatures to the entrance of the extraction column containing the most extracted coffee in the percolator set, typically referred to as the spent stage extraction column. The extraction liquid passes through this column extracting soluble coffee solids from the coffee contained therein, exits this column, and is passed to and through the next successive extraction column containing the next most extracted roasted and ground coffee in the percolator set. In a similar manner the extraction liquid is passed through successive extraction columns containing progressively less extracted or fresher roasted and ground coffee extracting soluble coffee solids therefrom. Finally, the extraction liquid is passed through the extraction column containing the least extracted roasted and ground coffee in the percolator set (generally fresh, unextracted roasted and ground coffee). This column is typically referred to as the fresh stage extraction column. A pre-determined quantity of extraction liquid is drawn-off from this column as coffee extract, thus completing a cycle, which is then further processed to produce a dry soluble coffee product. The coffee extract will typically contain between 20 percent – 35 percent soluble coffee solids by weight.

A new cycle is begun by taking the spent stage extraction column from the previous cycle off stream and placing an extraction column generally containing fresh unextracted roasted and ground coffee on-stream thus becoming the fresh stage extraction column for draw-off of coffee extract for this cycle. Aqueous extraction liquid is then fed to the spent stage extraction column for this cycle, the coffee contained therein being the next most extracted coffee in the previous cycle, and the process continues as before with extraction liquid passing through extraction columns containing progressively less extracted roasted and ground coffee and finally being drawn off as coffee extract from the fresh stage extraction column.

In this manner, then, a given bed of roasted and ground coffee becomes progressively more extracted with each cycle. (Cycle being defined as the period between successive draw-offs of coffee extract from the fresh stage extraction column.)

An understandably important consideration in the coffee percolation art is to maximize the yield of soluble coffee solids obtained from a given charge of roasted and ground coffee. Unique to percolation, however, is the desire to avoid impairment of the characteristic flavor and aroma constituents of coffee so that the final soluble coffee product will more nearly resemble freshperked roasted and ground coffee. This factor often must often be balanced against yield maximization. Thus, for example, the use of extremely high temperatures, while useful in achieving high yields, is to be avoided since it will significantly impair and alter the delicate flavor and aroma characteristics of the coffee.

While numerous advances have been made in the art in achieving relatively good yields without substantially affecting product quality there exists a recognized need for further improvement in this area.

SUMMARY OF THE INVENTION

It has been found that the yield of soluble coffee solids from roasted and ground coffee can be increased by loading the extraction columns of the percolator set with roasted and ground coffee such that the average particle size of the coffee particles decreases in the direction of flow of the extraction liquid.

In packed bed extraction columns such as coffee extraction columns any tendency of the extraction liquid to channel is detrimental to the efficiency of extracting the packed bed. Channelling is a maldistribution of the extraction liquid through the roasted and ground coffee bed. This uneven or non-uniform flow follows preferential flow paths through the packed coffee bed and causes the areas outside of the preferential flow to be extracted to a lesser extent or not at all. The yield of soluble solids extracted based on the weight of the coffee bed is therefore decreased and further the quality of the resultant coffee extract may be lessened due to many flavorful coffee solids being unextracted.

The process of this invention serves to minimize channelling in the extraction columns and hence results in more efficient extraction of the roasted and ground coffee.

DETAILED DESCRIPTION OF THE INVENTION

In accordance with the process of this invention the roasted and ground coffee is positioned in the extraction columns of the percolator set such that the average particle size of the coffee decreases in the direction of flow of the aqueous extraction liquid.

It has been found that operation of the percolation process in this manner has the effect of insuring that the rate of change of pressure in the extraction column increases in the direction of the flow of the aqueous extraction liquid. This physical situation results in a uniform flow of extraction liquid through the bed of roasted and ground coffee with a minimum of channelling and bypassing of the coffee particles.

Various means may be employed to achieve the criteria of positioning the roasted and ground coffee within the extraction column such that the average particle size of the coffee particles continually decreases in the direction of liquid flow. In one embodiment of this invention, a coffee grinder is positioned such that the extraction column can be directly loaded with the ground coffee. The required amount of coffee is then passed through the coffee grinding apparatus while the grind setting of the apparatus is continually altered to produce particles of decreasing size as the extraction column is filled. Most commercial grinders are capable of such operation. It is apparent of course that while reference is made to a "grinder" any means of subdividing roasted coffee such as crushing, breaking, flaking, etc. may be employed.

Another means of achieving the roasted and ground coffee positions within the column critical to this invention involves subdividing the roasted coffee by any appropriate means and then separating the ground particles into two or more fractions of differing average grind size as for example by screening. Thus, for example, where two fractions are employed one being "coarse" and the other "fine" relative to the other, the extraction column is loaded first with coarse particles and then with mixtures of the coarse and fine particles progressively increasing in their concentration of fine particles, and then finally filling the extraction column with a last fraction comprised of only the fine coffee. This metering of the differing particle size fractions results in a continually decreasing average particle size within the extraction column.

When operating the percolation process according to this invention it will be appreciated that there can be finely-ground particles of roasted coffee at the outlet area of the extraction column. It may be desirable, in order to preclude the possibility of these fine particles plugging up the orifices of the fluid outlet means, to confine the roasted and ground coffee to a position above or below, depending upon whether downflow or upflow operation is utilized, the fluid outlet means. The remaining area in the extraction column can be "capped" within an inert filler material in accordance with our commonly-assigned application, our Ser. No. 417,337.

The key to the present invention is the continual or progressive decrease in the average particle size of the roasted coffee in the extraction column in the direction of flow of the aqueous extraction liquid. It will be appreciated by those skilled in the art that generally commercial percolation processes necessitate the use of commercial subdividing apparatus which do not yield coffee particles of exactly the same size but rather yield a distribution of particle sizes. Hence, in the context of the present invention, the average particle size is employed to indicate that from one particular area of the coffee bed to the next, the size of the predominant number of particles decreases, i.e., the average particle size decreases.

While a certain number of un-averaged sized particles may be tolerated in proceeding from one fractional section of the coffee bed to the next, it has been found that certain limits exist in the amount of particles of uniform size which can be tolerated. For example, when the extraction column is filled in thirds, in the direction of flow, with coarsely ground coffee, then coffee of an intermediate grind, and then finely ground coffee, the advantages of this invention will not be achieved if the length of the bed of the uniformly sized particles is too long. Within these distinct zones of coffee particles having an average uniform size the extraction liquid will exhibit channelling and poor extraction will be encountered. While channelling is minimized at those areas in the column where transition occurs from larger to smaller average particle sizes such is not effective to offset the channelling occurring before and after these areas. As a general requirement, areas of uniformly sized particles should be no greater than, say, about 1/40 to 1/15 of the overall height of the packed coffee bed. Thus, for example, for column beds of 20 feet in height, uniformly sized particles may be tolerated in areas ranging from 6 inches to 18 inches. When such criteria is met the average particle size is said to be continually decreasing within the context of this invention and channelling is minimized. Where such criterion is exceeded channelling will occur within the zones of uniform particle size to such a degree that no yield advantages are achieved. However, it is most preferred to have the extraction column loaded such that the average particle size of the roasted and ground coffee truly decreases from one point in the column to the next in the direction of extraction liquid flow.

The roasted and ground coffee of this invention may be decaffeinated and undecaffeinated coffee and may be a single coffee variety or a blend of coffee varieties. In a preferred embodiment of this invention a blend of coffee varieties is employed in each extraction column to achieve a quality improvement in the coffee extract drawn off from the fresh stage extraction column. The highest quality coffee of the blend is ground to a finer particle size than the other coffee varieties. Finer-sized coffee particles are more easily extracted of their soluble constituents and hence more of the coffee solids from the higher quality coffee are contained in the resultant coffee extract.

The aqueous extraction liquid of this invention, while generally water, may be a solution of solids such as salts or soluble coffee solids. It is generally preferred to feed the aqueous extraction liquid to the spent stage extraction column at temperatures in the range of 300°F to 350°F and to draw-off coffee extract from the fresh stage extraction column at temperatures below about 220°F. Suitable intercolumn heaters or coolers may be employed according to methods well known in the art to achieve this or any other desired temperature profile.

The process of this invention may be illustrated by the following examples.

EXAMPLE I

Roasted coffee is ground in a commercially available grinder and the resultant ground coffee is divided via screening into two equal weight fractions one having particle sizes below a 10 mesh U.S. screen size the other fraction being particles above that screen size. The fractions are loaded into separate feed hoppers leading into a vertical extraction column and the slide gate on the hopper containing the coarser fraction is metered to be open wide at the start of filling the column and progressively closed slowly during the feed period. The finer fraction is metered in the converse manner. The direction of flow of the aqueous extraction liquid through this column is from bottom to top.

EXAMPLE II

Roasted coffee is fed to two grinders whose settings are such that one grinder produces a grind distribution such that at least 90 percent of the particles will not pass through an 8 mesh U.S. screen and the other grinder produces a distribution such that at least 90 percent of the particles pass through an 8 mesh U.S. screen with less than about 2 percent of the particles being able to pass through a 40 mesh U.S. screen. The two ground fractions are passed to separate feed hoppers which are metered in accordance with Example I while the extraction column is being loaded. Extraction liquid flow is in the upflow direction.

While this invention has been described with respect to certain embodiments and examples of the best mode of practicing the process, such examples are not intended to be limiting in any way. Obvious modifications and variations are believed ascertainable by those skilled-in-the-art without departing from the scope and spirit of the invention is defined by the appended claims.

I claim:

1. In a coffee percolation process wherein roasted and ground coffee is countercurrently contacted with an aqueous extraction liquid in a series of extraction columns of a percolator set, the improvement comprising positioning said roasted and ground coffee within each extraction column such that the average particle size of the roasted and ground coffee continually decreases in the direction of flow of said aqueous extraction liquid throughout said extraction column.

* * * * *